(12) United States Patent
Komatsubara

(10) Patent No.: US 9,752,788 B2
(45) Date of Patent: Sep. 5, 2017

(54) HUMIDIFICATION DEVICE

(71) Applicant: DENSO CORPORATION, Kariya, Aichi-pref. (JP)

(72) Inventor: Yusuke Komatsubara, Okazaki (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 25 days.

(21) Appl. No.: 14/781,000

(22) PCT Filed: Jan. 13, 2014

(86) PCT No.: PCT/JP2014/000101
§ 371 (c)(1),
(2) Date: Sep. 28, 2015

(87) PCT Pub. No.: WO2014/162644
PCT Pub. Date: Oct. 9, 2014

(65) Prior Publication Data
US 2016/0054013 A1    Feb. 25, 2016

(30) Foreign Application Priority Data

Apr. 5, 2013    (JP) .................................. 2013-079427

(51) Int. Cl.
*F24F 3/14*        (2006.01)
*F24F 6/08*        (2006.01)
*B60H 3/02*        (2006.01)

(52) U.S. Cl.
CPC ............. *F24F 3/1429* (2013.01); *B60H 3/02* (2013.01); *B60H 3/022* (2013.01); *F24F 6/08* (2013.01);
(Continued)

(58) Field of Classification Search
CPC .......... F24F 6/08; F24F 3/1429; F24F 3/1411; F24F 3/14; F24F 6/12; F24F 7/007;
(Continued)

(56) References Cited

U.S. PATENT DOCUMENTS 5,176,005 A * 1/1993 Kaplan ................. F24F 3/1423
62/271
5,725,639 A * 3/1998 Khelifa .................. B60H 3/024
55/385.3
(Continued)

FOREIGN PATENT DOCUMENTS

JP    H07275642 A    10/1995
JP    H08067136 A    3/1996
(Continued)

OTHER PUBLICATIONS

International Search Report and Written Opinion (in Japanese with English Translation) for PCT/JP2014/000101, mailed Feb. 10, 2014; ISA/JP.

*Primary Examiner* — Mohammad M Ali
(74) *Attorney, Agent, or Firm* — Harness, Dickey & Pierce, P.L.C.

(57) ABSTRACT

In an adsorption operation in which the adsorption agent adsorbs water, air in a vehicle compartment flows into an adsorption agent module after being cooled by passing around a heat sink. On the other hand, in a desorption operation in which the water is desorbed from the adsorption agent, the air in the vehicle compartment flows into the adsorption agent module to be humidified without being heated or cooled, and humidified air is cooled by passing around the heat sink and blown into the vehicle compartment. Accordingly, a temperature of the humidified air can be prevented from increasing unnecessarily by a simple configuration with which the air in the vehicle compartment is cooled in the heat sink.

7 Claims, 3 Drawing Sheets

(52) U.S. Cl.
CPC ....... *B60H 2003/028* (2013.01); *F24F 3/1411* (2013.01)

(58) Field of Classification Search
CPC . F24F 11/00; B60H 3/022; B60H 3/02; B60H 2003/028
USPC .......................................................... 62/271
See application file for complete search history.

(56) References Cited

U.S. PATENT DOCUMENTS

| | | | | |
|---|---|---|---|---|
| 6,029,462 | A * | 2/2000 | Denniston | B01D 53/06 62/244 |
| 6,324,860 | B1 * | 12/2001 | Maeda | F24F 3/1423 62/271 |
| 2010/0022177 | A1 * | 1/2010 | Hidaka | B60H 1/00478 454/156 |
| 2010/0107656 | A1 * | 5/2010 | Nakaguro | B60H 3/02 62/3.4 |
| 2010/0107673 | A1 * | 5/2010 | Nakaguro | B60H 3/024 62/271 |
| 2010/0132379 | A1 * | 6/2010 | Wu | F24F 3/1423 62/3.2 |
| 2011/0079029 | A1 * | 4/2011 | Morisaku | B60H 1/00392 62/94 |

FOREIGN PATENT DOCUMENTS

| | | |
|---|---|---|
| JP | 3254381 B2 | 2/2002 |
| JP | 2008247305 A | 10/2008 |
| JP | 2009006949 A | 1/2009 |
| JP | 2009196511 A | 9/2009 |
| JP | 2011177657 A | 9/2011 |
| JP | 2011255331 A | 12/2011 |
| JP | 2012224135 A | 11/2012 |

\* cited by examiner

HUMIDIFICATION DEVICE

CROSS REFERENCE TO RELATED APPLICATIONS

This application is a U.S. National Phase Application under 35 U.S.C. 371 of International Application No. PCT/JP2014/000101 filed on Jan. 13, 2014 and published in Japanese as WO 2014/162644 A1 on Oct. 9, 2014. This application is based on and claims the benefit of priority from Japanese Patent Application No. 2013-079427 filed on Apr. 5, 2013. The entire disclosures of all of the above applications are incorporated herein by reference.

TECHNICAL FIELD

The present disclosure relates to a humidification device for humidifying air by water desorbed from an adsorption agent.

BACKGROUND ART

Conventionally, a so-called desiccant system is known to alternately switch between an adsorption operation in which water is adsorbed on an adsorption agent and a desorption operation in which the water is desorbed from the adsorption agent by heating the adsorption agent that is after adsorbing water. Accordingly, the adsorption agent is recovered. Patent Document 1 discloses a humidification device using the desiccant system.

More specifically, the humidification device of Patent Document 1 is for a vehicle and performs a desorption operation of the adsorption agent by heating the adsorption agent using an electric heater that is a heating device. Air drawn from a window side in a vehicle compartment is humidified by water that is desorbed from the adsorption agent, and humidified air is blown from an opening portion that is open toward a passenger.

On the other hand, when the adsorption agent is in an adsorption operation, water included in air that is drawn from the opening portion opening toward the passenger is adsorbed on the adsorption agent. Accordingly, dried air (of which humidity is decreased) is blown to the window to suppress fogging of the window.

PRIOR ART DOCUMENT

Patent Document

Patent Document 1: JP 2008-247305 A

SUMMARY OF INVENTION

However, according to studies conducted by the inventor of the present disclosure, air of which temperature increases in addition to an increase of humidity is blown toward the passenger in a case where the humidification device of Patent Document 1 or the like has a configuration in which the adsorption agent is heated to humidify the vehicle compartment. When air having high-temperature and high-humidity is blown toward a face and an upper body of the passenger, a convenient felling of the passenger provided by an air conditioning cooling the head and heating the feet is deteriorated.

Patent Document 1 proposes an idea of blowing air to the passenger after cooling the air having high-temperature and high-humidity by using a cooler such as a peltier element to humidify the vehicle compartment. However, disposing a cooler such as a peltier element in addition to a heating device heating the adsorption agent may make a configuration of the humidification device complicated and may cause an increase of a manufacturing cost.

The present disclosure addresses the above issues, and it is an objective of the present disclosure to provide a humidification device that can prevent a temperature of humidified air from increasing unnecessarily.

To achieve the above objective, a humidification device of the present disclosure humidifies a humidification-subject space by water that is desorbed from an adsorption agent. Specifically, the humidification device has a cooler cooling an adsorption air that includes water to be adsorbed on the adsorption agent.

In an adsorption operation in which water is adsorbed on the adsorption agent, the cooler decreases a temperature of the adsorption air to be lower than an air temperature in the humidification-subject space.

In a desorption operation in which water is desorbed from the adsorption agent, the water adsorbed on the adsorption agent is desorbed to air without heated or cooled in the humidification-subject space.

According to the humidification device, a relative humidity of the adsorption air can be higher than a relative humidity of air in the humidification-subject space since the cooler decreases the temperature of the adsorption air to be lower than the air temperature in the humidification-subject space in the adsorption operation. Accordingly, in the adsorption operation, water included in the adsorption air can be adsorbed on the adsorption agent by the adsorption air of which temperature is decreased and which is in contact with the adsorption agent.

Air without being heated or cooled in the humidification-subject space has a higher temperature and a lower relative humidity as compared to the adsorption air that is after being cooled. Accordingly, water that is adsorbed on the adsorption agent can be desorbed from the adsorption agent to air in the humidification-subject space by causing air, which is in the humidification-subject space and is without being heated or cooled, to be in contact with the adsorption agent in the desorption operation.

That is, since air in the humidification-subject space can be humidified without heating the adsorption agent, a device for heating the adsorption agent is not necessary. Furthermore, a temperature of humidified air does not increase. Therefore, according to the humidification device of the present disclosure, a temperature of humidified air can be prevented from increasing unnecessarily with a simple configuration.

In the present disclosure, "air without being heated or cooled in the humidification-subject space" does not mean only air of which temperature is not changed at all with respect to an air temperature in the humidification-subject space. For example, the air includes air which is in the humidification-subject space and of which temperature is slightly decreased by natural heat radiation while flowing in the ventilation passage.

DESCRIPTION OF EMBODIMENTS

An embodiment of the present disclosure will be described hereafter referring to drawings. In the present embodiment, a humidification device 10 of the present disclosure is used for a vehicle. Accordingly, a humidification-subject space is a vehicle compartment R in the present embodiment. Further, the vehicle has a vehicle air conditioner adjusting a temperature in the vehicle compartment R in addition to the humidification device 10.

Figure 1:
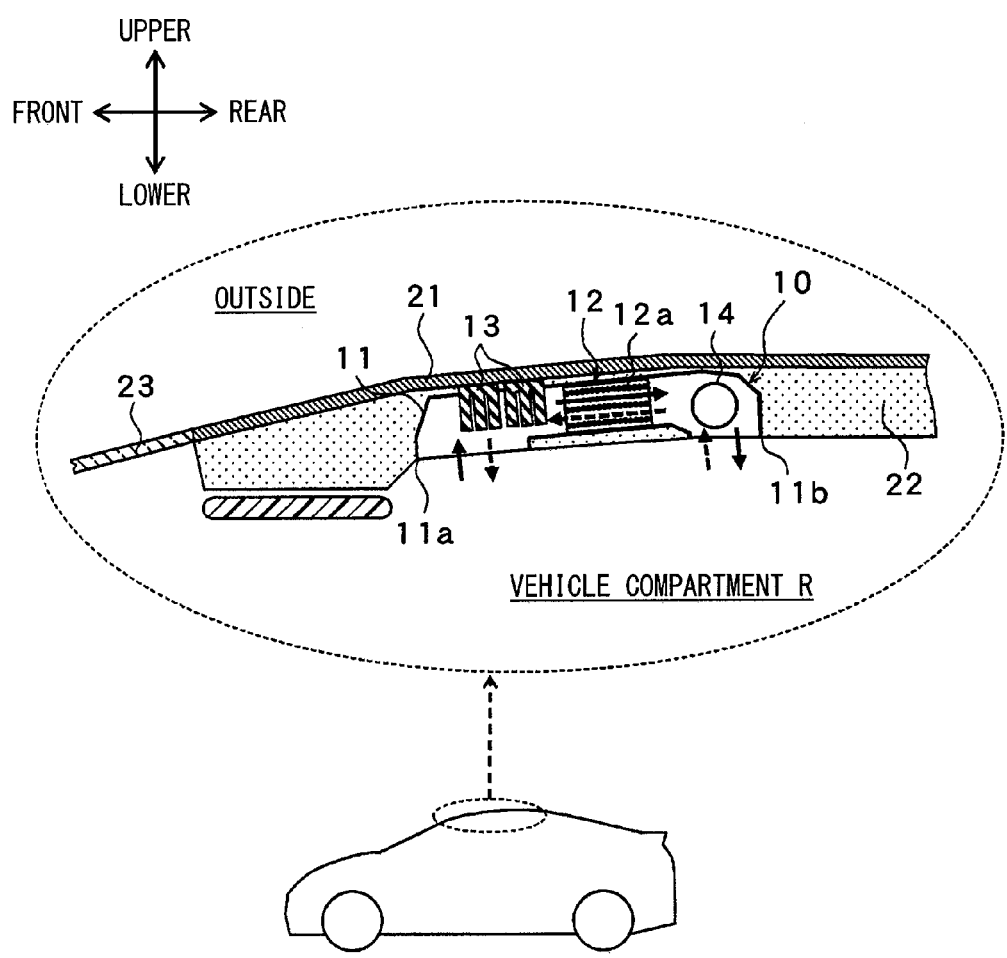
FIG. 1 is a sectional diagram taken in a front-rear direction and illustrating a whole configuration of a humidification device according to an embodiment.

As shown in FIG. 1, the humidification device 10 is located on a roof side in the vehicle. In FIG. 1, each arrow indicating upper, lower, right, or left respectively indicates upper, lower right, or left on a condition where the humidification device 10 is disposed in the vehicle. The humidification device 10 has a casing 11 providing an outer wall of the humidification device 10, and the casing 11 houses an adsorption agent module 12, a heat sink 13, a blower 14, and the like.

The casing 11 is made of resin or metal to have a box shape. The casing 11 defines an air passage in which air blown from the blower 14 flows. More specifically, the casing 11 has a thickness dimension in an upper-lower direction that is generally equal to a thickness dimension of an interior member 22 attached to a top panel 21 of the vehicle on an inside of the vehicle compartment. The casing 11 has generally a thin rectangular-parallelepiped shape extending along the top panel 21.

A lower surface (i.e., a surface adjacent to the inside of the vehicle compartment) of the casing 11 is provided with two opening portions through which air flows in-and-out between the vehicle compartment R and the air passage. More specifically, one of the two opening portions is a first opening portion 11a that is located on a front side in the vehicle and is open toward an upper body (specifically, a head) of a passenger seating on a front seat. The other one of the two opening portions is a second opening portion 11b that is located on a rear side in the vehicle and is open toward a rear seat.

The first and the second opening portions 11a, 11b have a mesh filter (not shown) having relatively small ventilation resistance and suppressing an inflow of a foreign material to the air passage defined in the casing 11.

The adsorption agent module 12 is provided with plate members that are made of metal, support the adsorption agent 12a, and are stacked to be distanced from each other. Passages through which air passes are defined between the plate members arranged to be stacked. In the adsorption agent module 12 of the present embodiment, by stacking the plate members supporting the adsorption agent 12a, an area in which air and the adsorption agent 12a are in contact with each other increases.

Moreover, the adsorption agent module 12 of the present embodiment uses a polymeric adsorption agent as the adsorption agent 12a. More specifically, in a temperature range simulated to be a temperature of air, the adsorption agent 12a has an adsorption characteristic with which an adsorbing water quantity (i.e., an adsorbing amount) varies by about 3-10 wt % (at least 3 wt % (weight percent)) when a temperature of air passing through the adsorption agent module 12 varies by 5° C.

Figure 2:
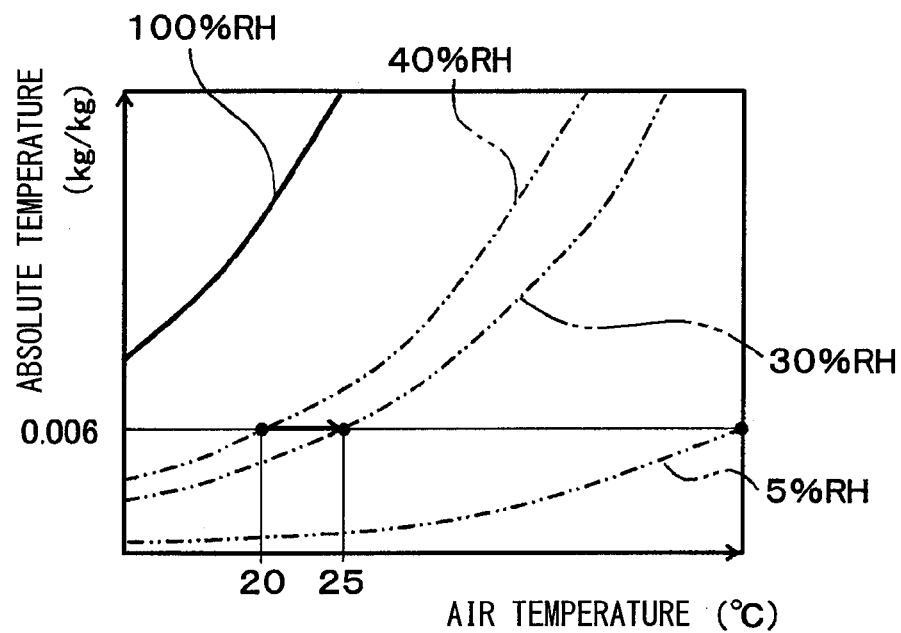
FIG. 2 is a humid psychometric chart.
Figure 3:
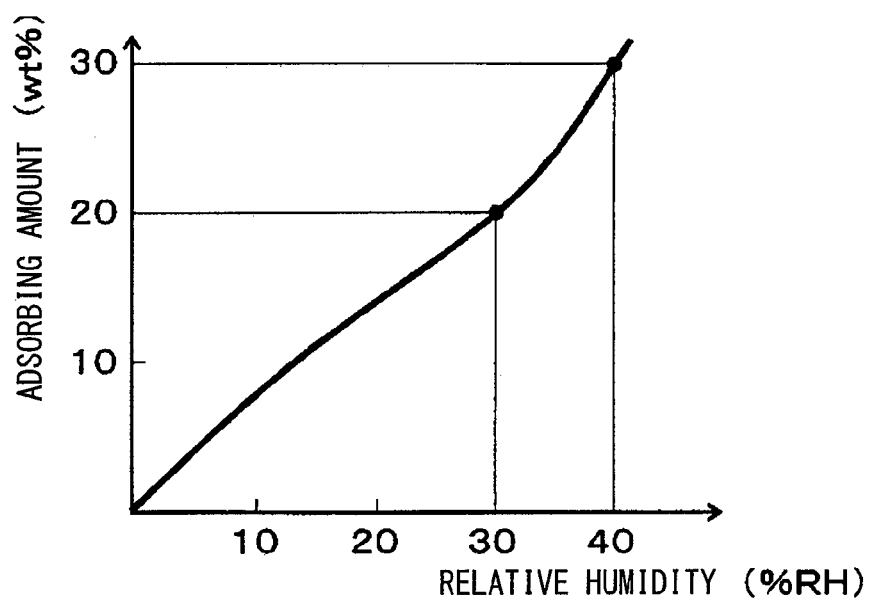
FIG. 3 is a graph showing an adsorption characteristic of an adsorption agent according to the embodiment.

As shown by a humid psychometric chart in FIG. 2, when a temperature of air of which temperature is 20° C. and of which relative humidity is 40% RH increases to 25° C., the relative humidity of the air decreases to about 30% RH. Accordingly, as shown by a graph showing an adsorption characteristic of the adsorption agent 12a in FIG. 3, the adsorbing amount may decrease by 3 wt %-10 wt % when the relative humidity of the air decreases from 40% RH to 30% RH.

In other words, the adsorption characteristic of the adsorption agent 12a of the present embodiment has a linearity in which the adsorbing amount varies in a range of 3 wt %-10 wt % when the relative humidity of air varies by 10% at least in the temperature range simulated to be a temperature of air that passes through the adsorption agent module 12. Since the temperature range simulated for the air is in a specified temperature range simulated to be a temperature in the vehicle compartment while performing an air conditioning, the temperature range may be set to be higher than or equal to 15° C. and lower than or equal to 30° C.

The heat sink 13 is a heat conducting member that has fins (i.e., plate members) made of metal (specifically, aluminum or copper) and having a great heat conductivity. The heat sink 13 is attached to the top panel 21 of the vehicle. The heat sink 13 exerts a function to transmit heat of outside air outside of the vehicle compartment into the air passage of the casing 11. Accordingly, the outside air outside of the vehicle compartment and air flowing in the air passage can exchange heat in the heat sink 13.

Generally, the humidification device 10 is operated, for example, in winter where a temperature of outside air is low and the vehicle compartment R is dried easily. Accordingly, it may be explained that the heat sink 13 constitutes a cooler that cools air by radiating cold of outside air to air flowing in the air passage to cool the air, in other words, constitutes a cooler that cools air by causing the air to radiate heat to outside air.

The blower 14 is an electric blower of which axial fan is operated rotatably by an electric motor, and an operation rate, in other words, a rotation speed (i.e., an air volume), is controlled based on a control voltage that is output by a controller as described after. Further, the blower 14 is constituted such that a flow direction of air can be switched in a manner that the controller switches a rotating direction of the electric motor.

More specifically, when the controller rotates the electric motor in a normal direction, air flows as shown by a solid thick line in FIG. 1. That is, air in the vehicle compartment R is drawn from the first opening portion 11a into the air passage of the casing 11, flows in the heat sink 13 and the adsorption agent module 12 in this order, and is blown from the second opening portion 11b toward the rear seat in the vehicle compartment.

When the controller inverts the electric motor, air flows as shown by a dashed thick line in FIG. 1. That is, air in the vehicle compartment R is drawn from the second opening portion 11b into the air passage of the casing 11, flows in the adsorption agent module 12 and the heat sink 13 in this order, and is blown from the first opening portion 11a toward the passenger seating on the front seat in the vehicle compartment R.

The controller that is not shown in the drawings is provided with a microcomputer including CPU, ROM, RAM, and the like and a peripheral circuit and controls an operation of the blower 14 that is connected to an output side of the controller.

The output side of the controller is connected with an inside air sensor that is an inside temperature detector detecting an air temperature Tr in the vehicle compartment R, an outside air sensor that is an outside temperature detector detecting an outside temperature (i.e., an outside air temperature) Tam, and the like. Detection signals from these sensors are input to the controller. An input side of the controller is connected with an operation switch operating the humidification device 10 and the like, and operation signals from the switch and the like is input to the controller.

The controller may be provided integrally with an air conditioning controller controlling an operation of various devices for the vehicle air conditioner.

An operation of the humidification device 10 of the present embodiment having the above-described configuration will be described next. The humidification device 10 of the present embodiment is operated when an operation switch is turned on (i.e., ON) by the passenger on a condition where a temperature in the vehicle compartment is adjusted by the vehicle air conditioner.

As described above, generally, the humidification device 10 is operated, for example, in winter, where outside temperature is generally low, and where the vehicle compartment R is dried easily. Accordingly, the following description is on an assumption of a condition where an outside temperature is 5° C., the air temperature Tr in the vehicle compartment R is regulated at 25° C., and the relative humidity in the vehicle compartment R is around 30% RH in an operation of the humidification device 10.

According to the humidification device 10 of the present embodiment, when the operation switch is turned on (i.e., ON), the controller alternatively switches between a condition where the electric motor for the blower 14 rotates in the normal direction and a condition where the electric motor is inverted at a specified regular intervals. As a result, a ventilation route in which air flows as shown by the solid thick line in FIG. 1 and a ventilation route in which air flows as shown by the dashed thick line in FIG. 1 are switched at the specified regular intervals.

Figure 4:
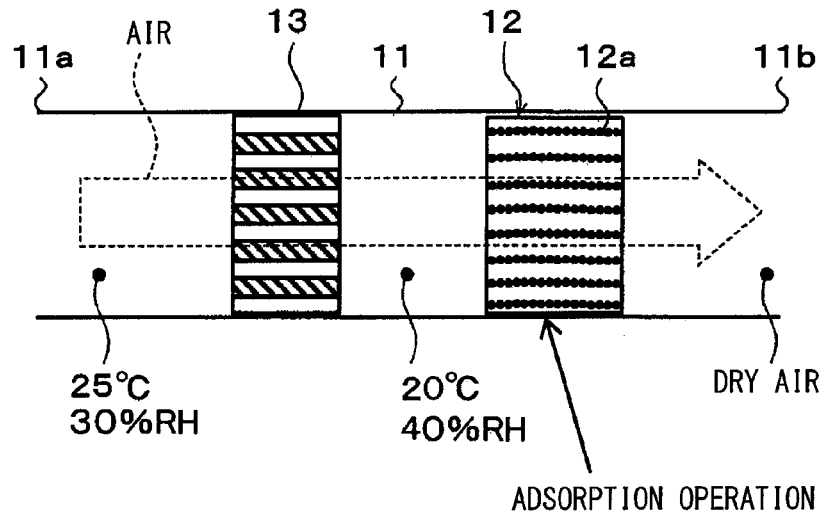
FIG. 4 is an explanatory diagram illustrating a variation of temperature and humidity of air in a ventilation passage in an adsorption operation performed by the humidification device according to the embodiment.

The condition where the controller rotates the electric motor for the blower 14 in the normal direction will be described referring to an explanatory diagram shown in FIG. 4. When the controller rotates the electric motor for the blower 14 in the normal direction, air which is in the vehicle compartment R and of which temperature is regulated at 25° C. is drawn into the air passage defined in the casing 11 of the humidification device 10 through the first opening portion 11a. Air drawn into the air passage is cooled while passes around the heat sink 13.

According to the present embodiment, the controller controls the rotation speed (i.e., the air volume) of the blower 14 such that a temperature TA of air after passing through the heat sink 13 becomes a specified temperature (specifically, 5° C.) lower than the air temperature Tr in the vehicle compartment R. Therefore, according to the present embodiment, the temperature TA of air after passing through the heat sink 13 decreases to around 20° C., and a relative humidity of the air increases to around 40% RH.

Air after passing through the heat sink 13 flows into the adsorption agent module 12. At this time, a relative humidity of air of which temperature decreases after passing through the heat sink 13 is higher than the relative humidity of air in the vehicle compartment R. Accordingly, by causing air after passing through the heat sink 13 to be in contact with the adsorption agent 12a of the adsorption agent module 12, water that is included in the air after passing through the heat sink 13 can be adsorbed on the adsorption agent 12a.

Air of which water content is adsorbed on the adsorption agent 12a and which is dried in the adsorption agent module 12 is blown toward the rear seat through the second opening portion 11b.

Figure 5:
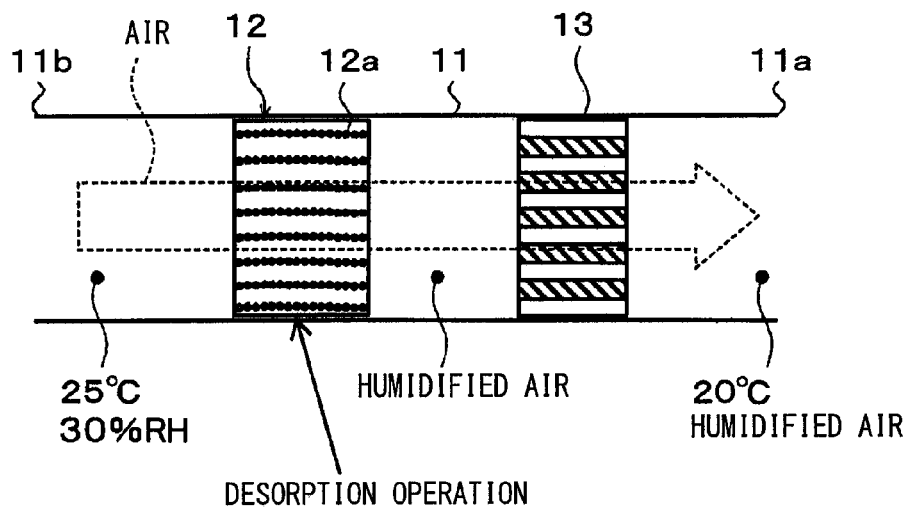
FIG. 5 is an explanation diagram illustrating a variation of temperature and humidity of air in the ventilation passage in a desorption operation performed by the humidification device according to the embodiment.

An operation in which the controller inverts the electric motor for the blower 14 will be described hereafter referring to FIG. 5. When the controller inverts the electric motor for the blower 14, air which is in the vehicle compartment R and of which temperature is regulated at 25° C. is drawn into the air passage that is defined in the casing 11 of the humidification device 10. The air drawn into the air passage flows into the adsorption agent module 12 without being heated or cooled.

Accordingly, air of which temperature (specifically 25° C.) and humidity (specifically 30% RH) are generally equal to that of the air in the vehicle compartment R can be in contact with the adsorption agent 12a, and water adsorbed on the adsorption agent 12a can be desorbed. Moreover, air that is humidified by water desorbed from the adsorption agent 12a in the adsorption agent module 12 can be cooled while passes around the heat sink 13.

Similar to the case where the electric motor for the blower 14 rotates in the normal direction, the controller controls a rotation speed (i.e., an air volume) of the blower 14 such that a temperature of air after passing through the heat sink 13 becomes a specified temperature (specifically, 5° C.) lower than the air temperature Tr in the vehicle compartment R.

Therefore, according to the present embodiment, a temperature of the air after passing through the heat sink 13 decreases to about 20° C. As a result, a relative humidity of the air after passing through the heat sink 13 further increases. The air which is after passing through the heat sink 13 and of which temperature decreases is blown toward the upper body of the passenger through the first opening portion 11a.

As described above, it is obvious that (i) the adsorption operation in which the adsorption agent 12a adsorbs water is performed when the controller rotates the electric motor for the blower 14 in the normal direction and (ii) the desorption operation in which water is desorbed from the adsorption agent 12a is performed when the controller inverts the electric motor for the blower 14, according to the humidification device 10 of the present embodiment.

In other words, the adsorption operation and the desorption operation of the adsorption agent 12a are switched by switching between the ventilation passage through which air blown from the blower 14 flows into the adsorption agent module 12 after passing around the heat sink 13 and the ventilation passage through which air blown from the blower 14 flows into the adsorption agent module 12 without passing around the heat sink 13.

The air, which is drawn into the air passage in the casing 11 from the vehicle compartment R through the first opening portion 11a when the controller rotates the electric motor for the blower 14 in the normal direction, is an example of an adsorption air.

Since the humidification device 10 of the present embodiment operates as described above, air in the vehicle compartment R can be humidified by water that is desorbed from the adsorption agent 12a in the desorption operation. In this case, a device for heating the adsorption agent 12a is unnecessary since the air in the vehicle compartment R can be humidified without heating the adsorption agent 12*a*. Furthermore, a temperature of the humidified air does not increase.

Therefore, according to the humidification device 10 of the present embodiment, it is able to provide a humidification device with which a temperature of humidified air can be prevented from increasing unnecessarily with a simple structure. Moreover, since a device for heating the adsorption agent 12*a* is unnecessary, energy consumption as a whole of the humidification device 10 in operation can be reduced, the humidification device 10 as a whole can be downsized, and a manufacturing cost can be reduced.

In addition, according to the humidification device 10 of the present embodiment, the heat sink 13 is used as the cooler in which the outside air outside the vehicle compartment and the air in the vehicle compartment R, which is the adsorption air, exchange heat to cool the air in the vehicle compartment R. Accordingly, power is not necessary for cooling air in the vehicle compartment R. Thus, as a whole of the humidification device 10, energy consumption can be further reduced.

According to the humidification device 10 of the present embodiment, the controller rotates the electric motor for the blower 14 in the normal direction or inverts the electric motor to switch the ventilation passages such that the adsorption operation and the desorption operation of the adsorption agent 12*a* are switched. Accordingly, a ventilation-passage switching part for switching the ventilation passages is not necessary. Thus, the humidification device 10 can be further downsized as a whole, and the manufacturing cost can be further reduced.

According to the humidification device 10 of the present embodiment, the humidified air is cooled by the heat sink 13 when the controller inverts the electric motor for the blower 14, in other words, when the desorption operation of the adsorption agent 12*a* is performed. Accordingly, the humidified air of which temperature is lower than a temperature in the vehicle compartment R can be blown toward the upper body of the passenger. As a result, a moisturizing effect by humidification can be improved, and the passenger can feel comfortable by cooling the head and heating the feet of the passenger.

According to the humidification device 10 of the present embodiment, an adsorption agent, in which an adsorbing amount varies by larger than or equal to 3 wt % when a relative humidity of air varies by 10% RH within the temperature range that is simulated to be a temperature of the air passing through the adsorption agent module 12, is used as the adsorption agent 12*a*. Therefore, even when the passenger adjusted a temperature in the vehicle compartment R to be a required temperature by using the vehicle air conditioner, air can be certainly humidified when the desorption operation is set from the adsorption operation of the adsorption agent module 12.

(Other Modifications)

The present disclosure is not limited to the above-described embodiment and can be modified as required within a scope of the present disclosure.

(1) Although the heat sink 13 is used as a cooler in the above-described embodiment, the cooing device is not limited to such an example. For example, the cooler may be a peltier element, a vacuum carburation cooler, an adsorption cooler, or a vapor-compression refrigerant cycle device. In the above-described embodiment, the heat sink 13 is attached to the top panel 21 of the vehicle. However, a thermal conductive seat that is elastically deformable may be disposed between the heat sink 13 and the top panel 21 to reduce a thermal resistance between the heat sink 13 and the top panel 21.

(2) In the above-described embodiment, an example in which the adsorption agent module 12 is constituted by plate members that are made of metal, support the adsorption agent 12*a*, and are stacked to be distanced from each other is described. However, the adsorption agent module 12 is not limited to the example. For example, the adsorption agent 12*a* may be supported by corrugated plates that are bent to have a wavy shape, and the corrugated plates are stacked to be distanced from each other. Alternatively, a honeycomb member that has a passage defined to have a hexagonal shape in cross section and that supports the adsorption agent 12*a* may be used as the plate member.

(3) Although an example in which the adsorption operation and the desorption operation of the adsorption agent 12*a* are switched at the specified regular intervals is described in the above-described embodiment, a switching of the adsorption operation and the desorption operation is not limited to the example. For example, a detector detecting a temperature and a humidity of air that flows in or flows out of the first and the second opening portions 11*a*, 11*b* may be disposed. In such a case, the adsorption operation and the desorption operation are switched when a relative-humidity difference between a first relative humidity of air on a side adjacent to the first opening portion 11*a* and a second relative humidity of air on a side adjacent to the second opening portion 11*b* become lower than or equal to a predetermined value.

(4) Although the controller switches a configuration in which the ventilation passages are switched by rotating the electric motor for the blower 14 in the normal direction or inverting the electric motor is described in the above-described embodiment, a switching of the ventilation passages is not limited to such an example.

For example, the blower 14, the heat sink 13, and the adsorption agent module 12 may be arranged in this order in a flow direction of air, and a bypass passage that introduces air, which is blown from the blower 14, to flow to the adsorption agent module 12 while bypassing the cooler is provided. Further, a ventilation passage switching part may be disposed on an upstream side of the cooler and the bypass passage to switch between a ventilation passage through which air flows to the cooler and a ventilation passage through which air flows to the bypass passage.

In this case, the ventilation passage switching part is operated such that air flows to the cooler when the adsorption agent 12*a* is in the adsorption operation. On the other hand, the ventilation passage switching part is operated such that air flows to the bypass passage when the adsorption agent 12*a* is in the desorption operation. The ventilation passage switching part may have a configuration that operates a door member by a servo motor.

The blower 14, a cooler such as a peltier element that is switchable between an operating state and non-operating state, and the adsorption agent module 12 may be arranged in this order in the flow direction of air. In this case, the cooler is operated when the adsorption agent 12*a* is in the adsorption operation, and the cooler is stopped when the adsorption agent 12*a* is in the desorption operation.

However, the blower 14, the cooler, and the adsorption agent module 12 are not limited to be arranged in this order. Furthermore, multiple blowers may be disposed such that the adsorption operation and the desorption operation of the adsorption agent 12*a* are switched by switching blowers between a blower that is operated in the adsorption operation and a blower that is operated in the desorption operation.

(5) Although an example in which the air in the vehicle compartment R is the adsorption air in the above-described embodiment, air (i.e., outside air) that is outside of the vehicle compartment R may be used as the adsorption air.

(6) In the above-described embodiment, the first opening portion 11a is defined to open toward the upper body of the passenger seating on the front seat in the vehicle, and the second opening portion 11b is defined to open toward the rear seat. However, an arrangement of the first and the second opening portions 11a, 11b is not limited to such an example. For example, the first opening portion 11a may be defined to open toward an upper body of a passenger seating on the rear seat, and the second opening portion 11b may be defined to open toward a window 23 of the vehicle.

(7) An example in which humidified air flowing out of the adsorption agent module 12 in the desorption operation is cooled in the heat sink 13 disposed as the cooler is described. However, the humidified air flowing out of the adsorption agent module 12 in the desorption operation may be blown into a humidification-subject space without being cooled in the cooler.

(8) Although an example in which the polymeric adsorption agent is used as the adsorption agent 12a is described in the above-described embodiment, the adsorption agent 12a is not limited to the example. For example, silica may be used as long as having a similar adsorption characteristic.

(9) Although an example in which the humidification device 10 is disposed on the roof side in the vehicle is described in the above-described embodiment, an arrangement of the humidification device 10 is not limited to the example. The humidification device 10 is not limited to be used for a vehicle and may be used for a building such as a house. In this case, the humidification-subject space is a room.

What is claimed is:

1. A humidification device for humidifying a humidification-subject space, the humidification device comprising:
   a polymeric adsorption agent that adsorbs water in an adsorption operation and desorbs the water in a desorption operation;
   a cooler cooling an adsorption air that includes the water to be adsorbed on the polymeric adsorption agent; and
   a blower blowing the air in the humidification-subject space, wherein
   in the adsorption operation, the cooler decreases a temperature of the adsorption air to be lower than an air temperature in the humidification-subject space, and
   in the desorption operation, the water adsorbed on the polymeric adsorption agent is desorbed to the air, the air flowing from the humidification-subject space without being heated or cooled,
   the adsorption operation and the desorption operation are switched by switching between (i) a ventilation passage through which the air blown by the blower flows to the polymeric adsorption agent after being cooled by the cooler and (ii) the ventilation passage through which the air blown by the blower flows to the polymeric adsorption agent without being cooled by the cooler.

2. The humidification device according to claim 1, wherein
   the adsorption air is the air in the humidification-subject space.

3. The humidification device according to claim 1, wherein
   the cooler cools air that is humidified by water desorbed from the polymeric adsorption agent, in the desorption operation.

4. The humidification device according to claim 1, wherein
   the humidification device is disposed in a vehicle, and
   the humidification-subject space is a vehicle compartment.

5. The humidification device according to claim 4, wherein
   the cooler cools the adsorption air by a heat exchange between the adsorption air and an outside air outside of the vehicle compartment.

6. The humidification device according to claim 1, wherein
   a temperature in the humidification-subject space is regulated within a specified temperature range by a temperature controller, and
   the polymeric adsorption agent is an agent of which adsorbing amount varies by more than or equal to 3 wt % when a relative humidity of air around the agent varies by 10% RH.

7. The humidification device according to claim 1, wherein
   the polymeric adsorption agent, the cooler, and the blower are located in the ventilation passage.

* * * * *